US010471685B2

(12) United States Patent
Oono et al.

(10) Patent No.: US 10,471,685 B2
(45) Date of Patent: Nov. 12, 2019

(54) PACKAGING MATERIAL FOR POWER STORAGE DEVICE

(71) Applicant: TOPPAN PRINTING CO., LTD., Tokyo (JP)

(72) Inventors: Naoto Oono, Tokyo (JP); Koji Murata, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 145 days.

(21) Appl. No.: 15/077,326

(22) Filed: Mar. 22, 2016

(65) Prior Publication Data

US 2016/0204395 A1  Jul. 14, 2016

Related U.S. Application Data

(63) Continuation of application No. PCT/JP2014/074105, filed on Sep. 11, 2014.

(30) Foreign Application Priority Data

Sep. 24, 2013  (JP) .................................. 2013-197043

(51) Int. Cl.
*H01M 2/02* (2006.01)
*B32B 15/04* (2006.01)
(Continued)

(52) U.S. Cl.
CPC ............. *B32B 15/04* (2013.01); *B32B 7/12* (2013.01); *B32B 15/08* (2013.01); *B32B 15/20* (2013.01);
(Continued)

(58) Field of Classification Search
CPC .... H01G 11/78; H01M 2/026; H01M 2/0277; H01M 2/0285; H01M 2/0287; B32B 7/12;
(Continued)

(56) References Cited

U.S. PATENT DOCUMENTS

2010/0119821 A1* 5/2010 Uemura ................. C08G 18/10
428/355 N
2010/0255365 A1* 10/2010 Suzuta ..................... B32B 7/12
429/163
(Continued)

FOREIGN PATENT DOCUMENTS

JP       2007-169361 A     7/2007
JP       4559547 B2       10/2010
(Continued)

OTHER PUBLICATIONS

Sigma-Aldrich, Hexamethylene diisocyanate.*
(Continued)

*Primary Examiner* — Stewart A Fraser
*Assistant Examiner* — Victoria H Lynch
(74) *Attorney, Agent, or Firm* — Foley & Lardner LLP

(57) ABSTRACT

A packaging material for a power storage device of the present invention includes: a base layer having a first surface and a second surface, the first surface having at least a first adhesive layer, a metal foil layer, an anticorrosive treatment layer, a second adhesive layer, and a sealant layer laminated thereon in this order; and a base protective layer laminated on the second surface of the base layer, and formed containing at least one base resin selected from a group consisting of a polyester polyol and an acrylic polyol, each of which has a group having a hydroxyl group on a side chain, and a curing agent containing at least one of a biuret type and an isocyanurate type of isocyanate.

18 Claims, 1 Drawing Sheet

(51) Int. Cl.
  *B32B 27/20* (2006.01)
  *B32B 27/30* (2006.01)
  *B32B 27/36* (2006.01)
  *H01G 11/78* (2013.01)
  *B32B 7/12* (2006.01)
  *B32B 15/08* (2006.01)
  *B32B 15/20* (2006.01)
  *B32B 27/32* (2006.01)
  *B32B 27/08* (2006.01)
  *B32B 27/34* (2006.01)
  *B32B 27/40* (2006.01)
  *C09D 1/00* (2006.01)

(52) U.S. Cl.
  CPC ............. *B32B 27/08* (2013.01); *B32B 27/20* (2013.01); *B32B 27/308* (2013.01); *B32B 27/32* (2013.01); *B32B 27/34* (2013.01); *B32B 27/36* (2013.01); *B32B 27/40* (2013.01); *C09D 1/00* (2013.01); *H01G 11/78* (2013.01); *H01M 2/026* (2013.01); *H01M 2/0277* (2013.01); *H01M 2/0285* (2013.01); *H01M 2/0287* (2013.01); *B32B 2255/06* (2013.01); *B32B 2255/26* (2013.01); *B32B 2262/02* (2013.01); *B32B 2262/0246* (2013.01); *B32B 2262/0253* (2013.01); *B32B 2262/106* (2013.01); *B32B 2264/025* (2013.01); *B32B 2264/0214* (2013.01); *B32B 2264/0242* (2013.01); *B32B 2264/102* (2013.01); *B32B 2264/108* (2013.01); *B32B 2307/10* (2013.01); *B32B 2307/31* (2013.01); *B32B 2307/554* (2013.01); *B32B 2307/581* (2013.01); *B32B 2307/714* (2013.01); *B32B 2307/732* (2013.01); *B32B 2307/746* (2013.01); *B32B 2307/75* (2013.01); *B32B 2457/00* (2013.01); *B32B 2457/10* (2013.01); *B32B 2553/00* (2013.01); *H01M 2220/30* (2013.01); *Y02E 60/13* (2013.01); *Y02T 10/7022* (2013.01)

(58) Field of Classification Search
  CPC ......... B32B 15/08; B32B 15/20; B32B 27/20; B32B 27/308; B32B 27/32; B32B 27/36
  See application file for complete search history.

(56) References Cited

U.S. PATENT DOCUMENTS

| | | | |
|---|---|---|---|
| 2014/0242333 A1 | | 8/2014 | Oono et al. |
| 2014/0242450 A1 | | 8/2014 | Oono et al. |
| 2016/0049621 A1* | | 2/2016 | Hashimoto ......... H01M 2/0277 |
| | | | 429/176 |

FOREIGN PATENT DOCUMENTS

| | | | |
|---|---|---|---|
| JP | 2010261023 A | * | 11/2010 |
| JP | 2011-054563 A | | 3/2011 |
| WO | WO-2013/069698 A1 | | 5/2013 |
| WO | WO-2013/069704 A1 | | 5/2013 |

OTHER PUBLICATIONS

Machine Translation JP2010261023A (Year: 2010).*
Extended European Search Report issued in EP Patent Application No. 14848420.7 dated Feb. 16, 2017.
Chinese Office Action dated Apr. 10, 2018 in corresponding application No. 2014800518786.

* cited by examiner

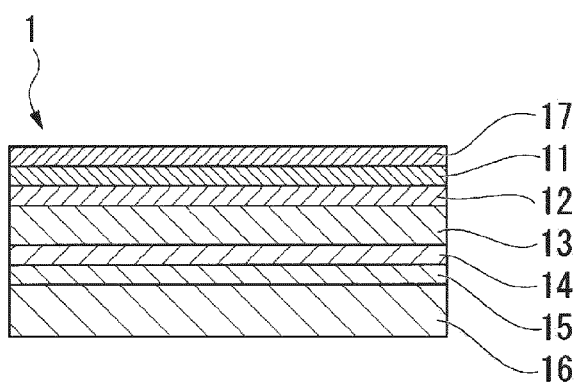

PACKAGING MATERIAL FOR POWER STORAGE DEVICE

CROSS-REFERENCE TO RELATED PATENT APPLICATIONS

This application is a continuation application filed under 35 U.S.C. § 111(a) claiming the benefit under 35 U.S.C. §§ 120 and 365(c) of PCT International Application No. PCT/JP2014/074105, filed on Sep. 11, 2014, which is based upon and claims the benefit of priority of Japanese Application No. 2013-197043, filed on Sep. 24, 2013, the entire contents of them all are hereby incorporated by reference.

TECHNICAL FIELD

The present invention relates to a packaging material for a power storage device.

BACKGROUND

As power storage devices used in mobile phones, portable terminal devices such as notebook computers, video cameras, satellites, electric vehicles, or the like, there are known, for example, lithium-ion batteries that can be made ultra-thin and small. In such a power storage device, contents such as a positive electrode material, a negative electrode material, a separator, an electrolytic solution, and the like are accommodated in a package, which is made by molding a packaging material for a power storage device (hereinafter may simply be referred to as a "packaging material") into a predetermined shape. As the package, there has conventionally been used a metal can-type package made by press-molding a metal plate or the like. In recent years, because of a high degree of freedom in shape and ease of weight reduction, there has widely been used a laminate film-type package made by cold-molding a laminate film including a metal foil such as an aluminum foil (e.g., a laminated configuration composed of base layer/first adhesive layer/metal foil layer/second adhesive layer/sealant layer).

A power storage device that uses a laminate film as a packaging material is manufactured by deep-drawing a laminate film by cold-molding to form a recess, housing the device contents in the recess, and thermally sealing the perimeter portion. In the power storage device, a larger depth of the recess can achieve a larger capacity for accommodating the contents and a higher energy density. Accordingly, a polyamide film, which has good moldability and is likely to cause cracks or pinholes if the recess has a large depth is preferably used for the base layer of a packaging material (e.g., PTLs 1 and 2). However, the polyamide film fails to have sufficient resistance to electrolytic solutions. Accordingly, in the case where a plurality of power storage devices are stacked and used, for example, if one of the storage devices is broken and an electrolytic solution leaks therefrom, the electrolytic solution may adhere to the packaging material of other power storage devices located around the broken one. In this case, the base layer may be dissolved due to the electrolytic solution, causing corrosion of the metal foil layer inside the packaging material. Moreover, the polyamide film fails to have sufficient scratch resistance, and hence may suffer a scratch on a surface of the base layer when handled, and impair the aesthetic quality, durability, and the like of the packaging material.

On the other hand, PTL 1 shows that, for the purpose of further improving moldability of the packaging material, a matte varnish layer is formed on an outer surface of the base layer. The matte varnish layer is formed of an olefin or alkyd synthetic resin such as a cellulose resin, a vinyl chloride-vinyl acetate resin, a modified polyolefin resin, a rubber, an acrylic resin, a urethane resin or the like, and a matting agent such as of silica, a kaolin or the like. However, being provided with the matte varnish layer, it is difficult to sufficiently suppress degradation of the base layer caused by the electrolytic solution, and impart sufficient scratch resistance.

Packaging materials that have commonly been used for such lithium-ion batteries include nylon for the base layers. To impart resistance to electrolytic solutions or aesthetic quality to the base layers, there is also a proposal that a base protective layer should be provided on an outer side of the base layer.

CITATION LIST

Patent Literature

PTL 1: JP-A-2011-054563
PTL 2: JP-B-4559547

SUMMARY OF THE INVENTION

Technical Problem

However, packaging materials configured to have base protective layers still suffer from the problems as set forth below.

During manufacture of a power storage device such as a lithium-ion battery, a bar code or the like may be printed on a surface of the packaging material by ink jet printing, for the purpose of lot tracing and the like. If there is a printing error, an alcohol or the like is used to remove the ink, and then printing is performed again on the surface of the packaging material. However, depending on the type of a material that forms the base protective layer, the base protective layer may not have resistance to alcohols and may peel off with the ink.

Moreover, in the case where an electrolytic solution adheres to the packaging material surface in the process of manufacturing a power storage device, an alcohol may be used to wipe off the electrolytic solution. In this case as well, the base protective layer may peel off and resistance to electrolytic solutions may be lost.

In both of the above cases, the packaging material can no longer be utilized again, raising a problem of lowering efficiency of manufacturing power storage devices.

In view of the circumstances described above, the present invention has a main object of providing a packaging material for a power storage device that enhances resistance to electrolytic solutions by providing a base protective layer, and can favorably be reused after wiping with an alcohol or the like.

[Improvement of or Solution to Problem]

A packaging material for a power storage device in one aspect of the present invention includes a base layer having a first surface and a second surface, the first surface having at least a first adhesive layer, a metal foil layer, an anticorrosive treatment layer, a second adhesive layer, and a sealant layer laminated thereon in this order; and a base protective layer laminated on the second surface of the base layer, and formed containing at least one base resin selected from a group consisting of a polyester polyol and an acrylic polyol, each of which has a group having a hydroxyl group on a side chain, and a curing agent containing at least one of a biuret type of isocyanate and an isocyanurate type of isocyanate.

In the packaging material for a power storage device in one aspect of the present invention, a ratio of the biuret type and the isocyanurate type to a total mass of the curing agent may be about 10 mass percent or more.

In the packaging material for a power storage device in one aspect of the present invention, a ratio of the biuret type to a total mass of the curing agent is in a range of about 10 mass percent or more to about 40 mass percent or less.

In the packaging material for a power storage device in one aspect of the present invention, the curing agent may be composed of a material of only one of the biuret type and the isocyanurate type.

In the packaging material for a power storage device in one aspect of the present invention, the curing agent may be composed of a material of both of the biuret type and the isocyanurate type.

In the packaging material for a power storage device in one aspect of the present invention, the isocyanate may be 1,6-hexamethylene diisocyanate.

In the packaging material for a power storage device in one aspect of the present invention, the base protective layer may contain a filler.

In the packaging material for a power storage device in one aspect of the present invention, the first adhesive layer may contain a filler.

[Potential Advantageous Effects of Invention]

According to the packaging material for the power storage device in one aspect of the present invention, there can be provided a packaging material for a power storage device that enhances resistance to electrolytic solutions using the base protective layer, and can favorably be reused after being wiped with an alcohol or the like.

BRIEF DESCRIPTION OF THE DRAWINGS

FIG. 1 is a cross-sectional view illustrating a packaging material for a power storage device according to an embodiment of the present invention.

DESCRIPTION OF REPRESENTATIVE EMBODIMENTS

In the present specification, a (meth)acrylic acid refers to an acrylic acid or a methacrylic acid. Regarding other compounds described in the present specification as well, materials affixed with "meth" should be similarly interpreted.

Hereinafter will be described a packaging material for a power storage device according to an embodiment of the present invention.

As shown in FIG. 1, a packaging material 1 for a power storage device of the present embodiment (hereinafter simply referred to as a "packaging material 1") is a laminate in which a first adhesive layer 12, a metal foil layer 13, an anticorrosive treatment layer 14, a second adhesive layer 15, and a sealant layer 16 are laminated in this order on a first surface of a base layer 11, and a base protective layer 17 is laminated on a second surface of the base layer 11. The packaging material 1, when used for a power storage device, is used such that the base protective layer 17 is located outermost and the sealant layer 16 is located innermost. In the packaging material 1, the base protective layer 17 is laminated on an outer side of the base layer 11 (position near the second surface).

(Base Protective Layer 17)

The base protective layer 17 is laminated on an outer surface (second surface) of the base layer 11, and formed of at least one base resin selected from a group consisting of a polyester polyol and an acrylic polyol, each having a group (functional group) having a hydroxyl group on a side chain (these may hereinafter collectively be referred to as "polyols"), and a curing agent containing at least one of a biuret type and an isocyanurate type of isocyanate.

The polyester polyol that has a group (functional group) having a hydroxyl group on a side chain (hereinafter referred to as a "polyester polyol (a1)") refers to a polyester polyol having a hydroxyl group at a side chain as well, in addition to the hydroxyl group at a terminal of a repeating unit.

An example of the polyester polyol (a1) includes, for example, a polyester polyol obtained by reaction of one or more dibasic acids with one or more compounds having three or more hydroxyl groups. An unreacted portion of the hydroxyl groups of the compound, which has three or more hydroxyl groups, becomes a hydroxyl group at the side chain of the polyester polyol (a1).

Examples of the dibasic acid include: an aliphatic dibasic acid such as succinic acid, glutaric acid, adipic acid, pimelic acid, suberic acid, azelaic acid, sebacic acid, or brassylic acid; and an aromatic dibasic acid such as isophthalic acid, terephthalic acid, or naphthalene dicarboxylic acid.

Examples of the compound having three or more hydroxyl groups include hexanetriol, trimethylol propane, and pentaerythritol.

Examples of the polyester polyol (a1) that may be used include compounds reacted, as necessary, with a diol, in addition to the dibasic acids and the compounds having three or more hydroxyl groups.

Examples of the diol include: aliphatic diols such as ethylene glycol, propylene glycol, butane diol, neopentyl glycol, methylpentane diol, hexane diol, heptane diol, octane diol, nonane diol, decane diol, and dodecane diol; alicyclic diols such as cyclohexane diol, and hydrogenated xylylene glycol; and aromatic diols such as xylylene glycol.

The hydroxyl groups at both terminals of the polyester polyol may be reacted with one or more bifunctional or more isocyanate compounds to obtain polyester-urethane polyol with an extended chain and this polyol may be used.

Examples of the bifunctional or more isocyanate compound include 2,4- or 2,6-tolylene diisocyanate, xylylene diisocyanate, 4,4'-diphenylmethane diisocyanate, methylene diisocyanate, isopropylene diisocyanate, lysine diisocyanate, 2,2,4- or 2,4,4-trimethylhexamethylene diisocyanate, 1,6-hexamethylene diisocyanate, methylcyclohexane diisocyanate, isophorone diisocyanate, 4,4'-dicyclohexylmethane diisocyanate, and isopropylidene dicyclohexyl-4,4'-diisocyanate. Alternatively, there may also be used polyester-urethane polyols whose chains have been extended using an adduct type, a biuret type, or an isocyanurate type of these isocyanate compounds.

The acrylic polyol that has a group having a hydroxyl group at the side chain (hereinafter referred to as an "acrylic polyol (a2)") has a hydroxyl group at a side chain as well, in addition to the hydroxyl group at a terminal of a repeating unit.

An example of the acrylic polyol (a2) includes a copolymer obtained by copolymerizing at least a hydroxyl group-containing acrylic monomer and a (meth)acrylic acid, and having a repeating unit derived from the (meth)acrylic acid as a main component.

Examples of the hydroxyl group-containing acrylic monomer include 2-hydroxyethyl (meth)acrylate, and 2-hydroxypropyl (meth)acrylate.

Examples of a component copolymerized with the hydroxyl group-containing acrylic monomer and the (meth) acrylic acid include: alkyl (meth)acrylate monomers (alkyl groups that can be mentioned include a methyl group, ethyl group, n-propyl group, i-propyl group, n-butyl group, i-butyl group, t-butyl group, 2-ethylhexyl group, cyclohexyl group, or the like); amide group-containing monomers such as (meth)acrylamide, N-alkyl (meth)acrylamide, N,N-dialkyl (meth)acrylamide (alkyl groups that can be mentioned include a methyl group, ethyl group, n-propyl group, i-propyl group, n-butyl group, i-butyl group, t-butyl group, 2-ethylhexyl group, cyclohexyl group, or the like), N-alkoxy (meth)acrylamide, N,N-dialkoxy (meth)acrylamide (alkoxy groups that can be mentioned include a methoxy group, ethoxy group, butoxy group, isobutoxy group, or the like), N-methylol (meth)acrylamide, and N-phenyl (meth)acrylamide; glycidyl group-containing monomers such as glycidyl (meth)acrylate, and allyl glycidyl ether; silane-containing monomers such as (meth)acryloxy propyl trimethoxy silane, (meth)acryloxy propyl triethoxirane; and isocyanate group-containing monomers such as (meth)acryloxy propyl isocyanate.

As a polyol, the acrylic polyol (a2) is preferable because of its better resistance to electrolytic solutions.

The polyols can be used according to the functions or properties that are desired, singly or in combination of two or more.

As the isocyanate used as the curing agent, either of an aliphatic isocyanate and aromatic isocyanate may be used, but an aliphatic isocyanate is preferable. An aliphatic isocyanate curing agent is a bifunctional or more isocyanate compound having no aromatic ring. The absence of the aromatic ring can prevent the occurrence of quinoidization of a benzene ring due to ultraviolet rays, and minimize yellowing, and hence an aliphatic isocyanate curing agent is suitable for the outermost layer. Examples of the aliphatic isocyanate curing agent include methylene diisocyanate, isopropylene diisocyanate, lysine diisocyanate, 2,2,4- or 2,4,4-trimethyl hexamethylene diisocyanate, 1,6-hexamethylene diisocyanate, methyl cyclohexane diisocyanate, isophorone diisocyanate, 4,4'-dicyclohexylmethane diisocyanate, and isopropylidene dicyclohexyl-4,4'-diisocyanate. By using a biuret type or an isocyanurate type of such an isocyanate compound, the base protective layer 17 to be formed will have an improved crosslink density and improved resistance to wiping with an alcohol. As a result, the base protective layer 17 can minimize degradation of the base layer 11 due to an electrolytic solution, and the base layer 11 is unlikely to peel off after wiping with an alcohol, thereby serving as a packaging material that can be favorably reused even after wiping. Especially, since use of a biuret type of isocyanate can further improve the crosslink density of the resin configuring the base protective layer, it is preferable that the base layer contains a biuret type of isocyanate.

If a ratio of the biuret type or the isocyanurate type of the isocyanate compound relative to a total mass of the curing agent is 10 mass percent (wt %) or more, the above effects are exerted. The higher the ratio is, the larger the above effects become. Accordingly, in order that the base protective layer 17 has an improved resistance to electrolytic solutions or to wiping with an alcohol, it is most preferable that the curing agent is composed of only one or both of the biuret type and the isocyanurate type.

On the other hand, if the biuret type is used, in particular, the crosslink density of the resin configuring the protective layer is improved to thereby enhance the hardness of the film, and hence excessive content of the biuret type is likely to impair moldability (see examples and comparative examples described below). From this point of view, the ratio of the biuret type to the curing agent is particularly preferably in a range of about 10 mass % or more to about 40 mass % or less. If the ratio of the biuret type is about 10 mass % or more, the biuret type greatly exerts an effect of improving resistance to electrolytic solutions or resistance to wiping with an alcohol. If the ratio of the biuret type is about 40 mass % or less, preferable moldability can be kept.

As the aliphatic isocyanate curing agent, 1,6-hexamethylene diisocyanate or isophorone diisocyanate is preferable because the resistance to electrolytic solutions is improved. In addition to improvement in self-repairability of the curing agent, regarding the reactivity between the above aliphatic isocyanate curing agent and the hydroxyl group of the above polyol, higher reactivity can be achieved between the 1,6-hexamethylene diisocyanate and the hydroxyl group of the above polyol, than the reactivity between the isophorone diisocyanate and the hydroxyl group of the above polyol. Accordingly, in view of mass productivity, 1,6-hexamethylene diisocyanate is particularly preferable.

As a combination of the base resin and the curing agent mentioned above, a combination of an acrylic polyol and a biuret type of 1,6-hexamethylene diisocyanate is more preferable.

The molar ratio of the isocyanate group contained in the isocyanate of the curing agent to the hydroxyl group contained in the polyol of the base resin (NCO/OH) is preferably in a range of 0.5 to 50, and more preferably in a range of 1 to 20. If the molar ratio (NCO/OH) is equal to or more than a lower limit (0.5), resistance to scratches and electrolytic solutions is improved. If the molar ratio (NCO/OH) is equal to or less than an upper limit (50), adhesiveness between the base protective layer and the base is easily ensured.

The thickness of the base protective layer 17 is preferably in a range of 1 to 10 µm, and more preferably in a range of 1 to 5 µm. If the thickness of the base protective layer 17 is equal to or more than a lower limit (1 µm), good resistance to electrolytic solutions is easily obtained.

If the thickness of the base protective layer 17 is equal to or less than an upper limit (10 µm), the base can be easily made thin, and stretchability is easily obtained.

The external surface of the base protective layer 17 is preferably subjected to a matte treatment. With the matte treatment, the surface of the base protective layer 17 will have improved slipperiness, and excessively intimate contact of the packaging material 1 with a mold during cold-molding is easily minimized, and thus the moldability is improved. In addition, a matte effect is also obtained.

To perform a matte treatment, a filler may be mixed in the base protective layer. Fillers that can be used include fine particles of an inorganic material such as silica, acryl, alumina, barium sulfate, calcium carbonate, or titanium oxide, and acrylic beads. Among them, fine particles of silica are preferable because they are resistant to resin cracks (whitening due to fine cracks) when the packaging material is press-molded.

If the mean particle size of the filler is smaller than 0.2 µm, sufficient slipperiness may not be obtained, and if the mean particle size is larger than 3 µm, the base protective layer may be brittle. Accordingly, the mean particle size of the filler is preferably in a range of 0.2 µm or more to less than 3 µm.

The content ratio of the filler in the base protective layer 17 (content ratio of the filler to the mass of the base protective layer 17) is desirably in a range of 5 mass % or more to 50 mass % or less. By setting the content ratio of the filler to 5 mass % or more, a given slipperiness can be imparted to the surface of the base protective layer. By setting the content ratio of the filler to 50 mass % or less, film roughness can be prevented from occurring in the surface of the base protective layer. With this content ratio, the external appearance of the surface of the packaging material 1 can be prevented from becoming poor.

The mean particle size of the embodiment of the present invention is defined to be a particle size measured by the Coulter counter method. The Coulter counter method is a method of measuring a particle size and a particle size distribution. Specifically, a partition wall that has one small hole is provided in an electrolyte solution, and electrodes are disposed on both sides of the partition wall. When a voltage is applied to the electrodes, current passes therethrough, and the electrical resistance obtained by this is determined by the volume of the small hole portion of the partition wall. When such a measuring method is used, a filler is dispersed in the electrolyte solution to thereby prepare a dilute suspension. When the suspension is sucked from one wall surface of the partition wall disposed in the suspension, particles will pass through the small hole of the partition wall from the other wall surface toward the first wall surface of the partition wall. At this time, the electrolyte is decreased from the electrolyte solution by a total volume of the particles that have passed through the small hole, thereby increasing the electrical resistance of the electrolyte solution. Therefore, an amount of change in the electrical resistance thus measured represents a particle volume, and the number of changes that occur in the electrical resistance represents particles. In this way, the particle size distribution can be obtained.

An additive such as a flame retardant, a lubricant (slip agent), an anti-blocking agent, an antioxidant, a photostabilizer, or a tackifier may be blended into the base protective layer 17.

Example of the lubricant include aliphatic acid amides such as oleic acid amide, erucic acid amide, stearic acid amide, behenic acid amide, ethylene bis-oleic acid amide, and ethylene bis-erucic acid amide. As the anti-blocking agent, various filler-based anti-blocking agents, such as silica, are preferable.

The above additives may be used singly or in combination of two or more.

Further, a slip agent layer may be formed on the base protective layer. The slip agent layer can be formed, for example, by means of a roll coating method or a spraying method, using a solution in which aliphatic acid amide is diluted in a solvent such as isopropyl alcohol, ethyl acetate, toluene, or methyl ethyl ketone at a content of 0.1 to 10%. If the amount of the aliphatic acid amide used for coating or sprayed is 0.1 mg or more per square meter, sufficient effects can be obtained. The amount of the aliphatic acid amide of 10 mg or less per square meter can prevent contamination of a mold used in cold-molding the packaging material and of a heat sealing device.

(Base Layer 11)

The base layer 11 serves to impart heat resistance in a sealing process performed when the power storage device is manufactured, and minimize generation of pinholes that may occur during mold-processing or distribution. Particularly, in the case, for example, of a packaging material of a lithium-ion battery used for a large size application, the base layer 11 can also impart abrasion resistance, chemical resistance, insulating properties, and the like.

For the base layer 11, a resin film formed of a resin having insulating properties is preferable. Examples of the resin film include stretched or unstretched films such as of a polyester film, a polyamide film, and a polypropylene film. The base layer 11 may be a single-layer film configured by the above resin film, or may be a laminated film using two or more resin films mentioned above.

As the base layer 11, a polyamide film is preferable among the above materials, because of its good moldability. Examples of a polyamide resin that forms the polyamide film include nylon 6, nylon 11, nylon 12, nylon 66, nylon 610, and nylon 612.

The thickness of the base layer 11 is preferably in a range of 6 to 40 µm, and more preferably in a range of 10 to 30 µm. If the thickness of the base layer 11 is equal to or more than a lower limit (6 µm), resistance to pinholes and insulating properties is improved. If the thickness of the base layer 11 is equal to or less than an upper limit (40 µm), moldability is improved.

(First Adhesive Layer 12)

The first adhesive layer 12 is formed between the base layer 11 and the metal foil layer 13. The first adhesive layer 12 is required to have, for example, a tight adhesive force necessary for firmly adhering the base layer 11 to the metal foil layer 13, as well as followability for protecting the metal foil layer 13 from being broken by the base layer 11 during cold-molding (performance for reliably forming the first adhesive layer 12 on a member without causing separation if the member is deformed or expanded/contracted). (For purposes of this application, the term "followability" means performance to keep the base layer and the metal foil layer together when the laminate is deformed or expanded/contracted on cold-molding.)

Examples of the first adhesive layer 12 include two-liquid curing-type polyurethane adhesives that use a polyol such as polyester polyol, polyether polyol, or acrylic polyol as a base resin, and use an aromatic or aliphatic isocyanate as a curing agent. The molar ratio of the isocyanate group of the curing agent to the hydroxyl group of the base resin (NCO/OH) is preferably in a range of 1 to 10, and more preferably in a range of 2 to 5.

The thickness of the first adhesive layer 12 is preferably in a range of 1 to 10 µm, and more preferably in a range of 2 to 6 µm to obtain desired adhesive strength, followability, processability, and the like.

A proper amount of a filler or a pigment, such as an inorganic substance, is preferably added to the first adhesive layer 12, for the purpose of preventing delamination of a stretched portion under a high-temperature condition (80° C. for 3 days). The pigment may be an organic pigment or an inorganic pigment, or a mixture thereof. The filler may be an organic filler or an inorganic filler, or a mixture thereof.

The first adhesive layer 12 is permitted to contain one or more selected from a group consisting of pigments and fillers to adjust elasticity modulus of the first adhesive layer 12. The adjustment of elasticity modulus can enhance reliability such as in resistance to high-temperature, moisture, or electrolytic solutions after deep-drawing or stretching of the packaging material.

The base layer 11 or the first adhesive layer 12 is also required to minimize breakage of the metal foil layer 13 when the packaging material is stretched. The first adhesive layer 12 according to the embodiment of the present invention achieves not only high adhesiveness but also good followability to the base layer 11 and the metal foil layer 13, and achieves an elasticity modulus approximate to that of the metal foil layer 13. Accordingly, reliability after deep-drawing or stretching of the packaging material is enhanced.

The type of pigment is not particularly limited as long as the adhesiveness of the first adhesive layer 12 is not impaired.

Examples of the organic pigment include azo, phthalocyanine, quinacridone, anthraquinone, dioxazine, indigothioindigo, perynone-perylene, or isoindolenin pigments. Examples of the inorganic pigment include carbon black, titanium oxide, cadmium, lead, or chromium oxide pigments, and additionally include fine powders of mica, and fish scale powder.

The pigment preferably has a functional group bonding to the isocyanate group of a curing agent, taking account of adhesiveness to the polyol and a urethane resin formed of the curing agent in the first adhesive layer 12. Examples of the functional group include a hydroxyl group, and the like.

As specific examples of the organic pigment, the following pigments can be used, for example.

Yellow: isoindolinone, isoindoline, quinophthalone, anthraquinone (flavanthrone), azomethine, xanthene, and the like Orange: diketo pyrrolopyrrole, perylene, anthraquinone, perynone, quinacridone, and the like Red: anthraquinone, quinacridone, diketo pyrrolopyrrole, perylene, indigoid, and the like Violet: oxazine (dioxazine) quinacridone, perylene, indigoid, anthraquinone, xanthene, benzimidazolone, violanthrone, and the like Blue: phthalocyanine, anthraquinone, indigoid, and the like Green: phthalocyanine, perylene, azomethine, and the like As specific examples of the inorganic pigment, the following pigments can be used, for example.

White: zinc white, white lead, lithopone, titanium dioxide, precipitated barium sulfate, barite powder, and the like Red: red lead, red iron oxide, and the like Yellow: chrome yellow, zinc yellow (zinc yellow 1, zinc yellow 2), and the like Blue: ultramarine blue, Prussian blue (potassium ferric ferrocyanide), and the like Black: carbon black, and the like Examples of the filler include resin fillers such as of a polyethylene resin, a polypropylene resin, a phenolic resin, an acrylic resin, and the like, and silica, and graphite. Examples of the shape of the filler include a flake-like shape, a spherical shape, a hollow shape, a fiber-like shape, and an irregular shape.

Since the filler having a high elasticity modulus contributes to an improvement of reliability, an inorganic filler is preferably used.

The first adhesive layer 12 may contain one, or two or more pigments and fillers.

The ratio of a total amount of the pigment and the filler in the first adhesive layer 12 (100 mass %) is 1 mass % or more, and preferably 5 mass % or more, which ensures higher reliability. Moreover, the content of the coloring component is 50 mass % or less, and preferably 20 mass % or less, which ensures good adhesiveness.

(Metal Foil Layer 13)

As the metal foil layer 13, various metal foils made of aluminum, stainless steel, and the like can be used, among which an aluminum foil is preferable in terms of being moisture proof, processability such as ductility and malleability, and cost.

As the aluminum foil, a known soft aluminum foil can be used, for example, and an aluminum foil that contains iron is preferable to obtain desired resistance to pinholes, and ductility and malleability at the time of molding. The content of iron in the aluminum foil (of 100 mass %) is preferably in a range of 0.1 to 9.0 mass %, and more preferably in a range of 0.5 to 2.0 mass %. When the content of iron is equal to or more than a lower limit (0.1 mass %), resistance to pinholes, and ductility and malleability are improved. When the content of iron is equal to or less than an upper limit (9.0 mass %), softness is improved.

As the aluminum foil, an annealed soft aluminum foil is much more preferable because desired ductility and malleability can be imparted in molding.

The thickness of the metal foil layer 13 is preferably in a range of 9 to 200 μm, and more preferably in a range of 15 to 150 μm to obtain desired barrier properties, resistance to pinholes, and processability.

A particularly-preferable metal foil layer 13 is an annealed soft aluminum foil having a thickness in a range of 15 to 150 μm. Specifically, materials 8021 and 8079 of the Japanese Industrial Standards are preferable.

The aluminum foil used for the metal foil layer 13 is preferably degreased to obtain desired resistance to electrolytic solutions. To simplify the manufacturing process, an aluminum foil having unetched surfaces is preferable.

Degreasing can be broadly classified into wet-type degreasing and dry-type degreasing, of which the latter is preferable to simplify the manufacturing process.

An example of the dry-type degreasing includes, for example, a method of prolonging the time of annealing the aluminum foil to achieve degreasing. Degreasing can be performed concurrently with the annealing for softening the aluminum foil. With the degreasing of this level as well, sufficient resistance to electrolytic solutions can be obtained. Besides the above degreasing methods, flame treatment, corona treatment, and the like can be used. Another degreasing that may be adopted is to utilize active oxygen generated by irradiation of ultraviolet rays having a specific wavelength to thereby oxidize, decompose and remove contaminants.

Examples of the wet-type degreasing include, for example, acid degreasing, alkali degreasing, and the like.

Examples of an acid used in the acid degreasing include inorganic acids such as sulfuric acid, nitric acid, hydrochloric acid, and hydrofluoric acid. The above acids may be used singly, or in combination of two or more. Examples of an alkali used in the alkali degreasing include sodium hydroxide having a high etching effect, and the like. As the alkali used in the alkali degreasing, mention can also be made of weak alkaline-based materials or materials blended with a surfactant.

The wet-type degreasing is performed using an immersion method or a spraying method.

(Anticorrosive Treatment Layer 14)

The anticorrosive treatment layer 14 serves to firmly adhere the metal foil layer 13 with the second adhesive layer 15, as well as to protect the metal foil layer 13 from an electrolytic solution or a hydrofluoric acid generated from the electrolytic solution.

The anticorrosive treatment layer 14 can be formed by, for example, a hot water modification treatment, anodization, chemical conversion treatment, or a combination thereof.

An example of the hot water modification treatment for forming the anticorrosive treatment layer 14 includes, for example, boehmite treatment in which an aluminum foil is immersed in boiling water to which triethanolamine is added. An example of the anodization includes, for example, alumite treatment. Examples of the chemical conversion treatment include, for example, chromate treatment, zirconium treatment, titanium treatment, vanadium treatment, molybdenum treatment, calcium phosphate treatment, strontium hydroxide treatment, cerium treatment, ruthenium treatment, or various chemical conversion treatments having a mixed-phase structure that contains materials used in these treatments. The chemical conversion treatments are not limited to wet types, but there can also be applied a method of mixing a treatment agent that contains a material used in these treatments, with a resin component, thereby coating the mixed material to the metal foil layer 13.

Of the above anticorrosive treatments, coating-type chromate treatment is preferable, from a viewpoint of maximizing the effect exerted by the anticorrosive treatment, as well as a viewpoint of waste liquid disposal.

In addition to the chemical conversion treatments mentioned above, the anticorrosive treatment layer 14 can also be formed by a pure coating technique alone. An example of such a method includes a method of using a sol of a rare earth element-based oxide, such as cerium oxide, having a mean particle size of 100 nm or less, as a material having an anticorrosive effect (inhibitor effect) on aluminum, and which is favorable in terms of the environment as well. By using the method with a commonly-used coating method, an anticorrosive effect can be exerted on a metal foil, such as an aluminum foil.

(Second Adhesive Layer 15)

The second adhesive layer 15 adheres the anticorrosive treatment layer 14 to the sealant layer 16. Depending on the type of the second adhesive layer 15, the packaging material 1 is broadly classified into two types, namely, a thermal laminate configuration and a dry laminate configuration.

In the case of the dry laminate configuration, the same adhesives as those exemplified in the first adhesive layer 12 can be used as a component that forms the second adhesive layer 15. In this case, to minimize swelling due to an electrolytic solution or hydrolysis due to a hydrofluoric acid, an adhesive to be used needs to be compositionally designed to use a base resin having a skeleton resistant to hydrolytic degradation, or to improve a crosslink density, for example.

An example of the technique of improving the crosslink density includes, for example, a method of using: a dimer aliphatic acid; an ester or a hydrogenated product of the dimer aliphatic acid; a reduced glycol of the dimer aliphatic acid; or a reduced glycol of the ester or the hydrogenated product of the dimer aliphatic acid. The dimer aliphatic acid is obtained by dimerizing various unsaturated aliphatic acids. Examples of the structure of the dimer aliphatic acid include an acyclic type, a monocyclic type, a polycyclic type, and an aromatic ring type. There is no particular limitation, either, in polybasic acid, which is a raw material of the polyester polyol used as an adhesive forming the second adhesive layer 15. Also, an aliphatic acid, which is a starting material of the dimer aliphatic acid, is not particularly limited, either. A dibasic acid as used in a normal polyester polyol may be introduced, with such a dimer aliphatic acid being contained as an essential component.

As the curing agent for the base resin, an isocyanate compound that can also be used as a chain extender of a polyester polyol can be used. Using the compound, the crosslink density of the adhesive coating film is enhanced, leading to an improvement of solubility or swellability, as well as an enhancement of urethane group concentration, which is expected to improve adhesiveness for the base.

In the case of the thermal laminate configuration, as a component forming the second adhesive layer 15, an acid-modified polyolefin resin is preferable, which is obtained by graft-modifying a polyolefin resin with an acid. Examples of the polyolefin resin include, for example, a low-density, medium-density, or high-density polyethylene; an ethylene-α olefin copolymer; homo-, block-, or random-polypropylene; and a propylene-α olefin copolymer. The polyolefin resins may be used singly, or in combination of two or more. Examples of an acid used in the graft modification include a carboxylic acid, an epoxy compound, an acid anhydride, and the like, and a maleic anhydride is preferable.

The component that configures the second adhesive layer 15 is one that easily maintains an adhesive force between the sealant layer 16 and the metal foil layer 13 when an electrolytic solution permeates. A preferably used component is a maleic anhydride-modified polyolefin resin obtained by graft-modifying a polyolefin resin with a maleic anhydride, and a particularly preferable component is maleic anhydride-modified polypropylene.

If the second adhesive layer 15 is formed by extrusion-molding, the adhesive resin tends to be oriented in an MD direction (machine direction) due to the stress or the like generated in extrusion-molding. In this case, to mitigate anisotropy of the second adhesive layer 15, an elastomer may be blended into the second adhesive layer 15.

Examples of the elastomer blended into the second adhesive layer 15 include an olefin-based elastomer, and a styrene-based elastomer. The mean particle size of the elastomer to be blended is preferably 200 nm or less to improve compatibility between the elastomer and the adhesive resin, and improve an effect of mitigating anisotropy of the second adhesive layer 15. The mean particle size is measured by capturing an enlarged image of a cross-section of an elastomer composition using an electron microscope, and measuring a mean particle size of dispersed cross-linked rubber components through an image analysis.

The elastomers mentioned above may be used singly, or in combination of two or more.

If the above elastomer is blended into the second adhesive layer 15, the amount of blending the elastomer in the second adhesive layer 15 (of 100 mass %) is preferably in a range of 1 to 25 mass %, and more preferably in a range of 10 to 20 mass %. If the amount of blending the elastomer is equal to or more than a lower limit (1 mass %), compatibility with the adhesive resin is improved, and an effect of mitigating anisotropy of the second adhesive layer 15 is improved. If the amount of blending the elastomer is equal to or less than an upper limit (25 mass %), swelling of the second adhesive layer 15 due to an electrolytic solution is easily minimized.

The second adhesive layer 15 may also be formed by using a dispersion-type adhesive resin solution that is obtained by dispersing the above adhesive resin in an organic solvent.

The thickness of the second adhesive layer 15 is preferably in a range of 1 to 40 μm, and more preferably in a range of 5 to 20 μm.

(Sealant Layer 16)

The sealant layer 16 is an internal layer of the packaging material 1 which is thermally adhered in assembling a battery. In other words, the sealant layer 16 is configured by a thermally adhesive film.

Examples of a component of the film that configures the sealant layer 16 include a polyolefin resin, and an acid-modified polyolefin resin obtained by graft-modifying the polyolefin resin with a maleic anhydride or the like. Among them, the polyolefin resin is preferable, and polypropylene is particularly preferable to improve water vapor barrier properties, and achieve easy formation of a battery form without being excessively damaged by heat sealing. An example of the polypropylene includes the polypropylene exemplified in the second adhesive layer 15.

The sealant layer 16 may be formed of a film in which the above various resins are mixed.

The sealant layer 16 may be a single-layer film or a multilayer film.

If a film formed by extrusion-molding is used as the sealant layer 16, the sealant layer 16 tends to be oriented in a direction along which the film is extruded. To mitigate anisotropy of the sealant layer 16 due to the orientation, an elastomer may be blended into the sealant layer 16. Blending of an elastomer can easily minimize whitening of the sealant layer 16 when the packaging material 1 is cold-molded to form a recess.

The elastomer to be blended into the sealant layer 16 can be the same materials as those mentioned as the elastomer to be blended into the second adhesive layer 15. The same applies to the preferable materials.

If the sealant layer 16 is a laminated film, an elastomer may be blended into only any of a plurality of layers that configure the laminated film, or may be blended into all of the layers. For example, if the sealant layer 16 is configured by three layers of random-polypropylene/block-polypropylene/random-polypropylene, the elastomer may be blended exclusively into the block-polypropylene layer, may be blended exclusively into the random-polypropylene layers, or may be blended into both of the random-polypropylene and block-polypropylene layers.

A lubricant may be blended into the sealant layer 16, for the purpose of imparting slipperiness to the sealant layer 16. By doing so, when a recess is formed in the packaging material 1 by cold-molding, a part of the packaging material 1 that will be a side or a corner of the recess and has a high stretching ratio is easily prevented from being stretched more than necessary. Accordingly, separation between the metal foil layer 13 and the second adhesive layer 15, or breakage or whitening of the sealant layer 16 and the second adhesive layer 15 due to cracks is easily minimized.

If a lubricant is blended into the sealant layer 16, the amount of blending the lubricant in the sealant layer 16 (of 100 mass %) is preferably in a range of 0.001 mass % to 0.5 mass %. If the amount of blending the lubricant is 0.001 mass % or more, an effect of minimizing whitening of the sealant layer 16 in cold-molding is easily obtained. If the amount of blending the lubricant is 0.5 mass % or less, the lubricant will bleed from the sealant layer to the laminated surfaces of other layers in the packaging material 1. Thus, lowering of adhesion strength is easily minimized.

(Manufacturing Method)

A method of manufacturing the packaging material 1 will hereinafter be described. However, the method of manufacturing the packaging material 1 is not limited to the method described below.

For example, the method of manufacturing the packaging material 1 includes steps (I) to (IV) set forth below.

(I) A step of forming the anticorrosive treatment layer 14 on the metal foil layer 13.

(II) A step of sticking the base layer 11, via the first adhesive layer 12, to a surface of the metal foil layer 13 opposite to the surface where the anticorrosive treatment layer 14 is formed.

(III) A step of sticking the sealant layer 16, via the second adhesive layer 15, to the anticorrosive treatment layer 14 of the metal foil layer 13.

(IV) A step of laminating the base protective layer 17 on the base layer 11.

Step (I)

An anticorrosive treatment agent is coated onto one surface of the metal foil layer 13, followed by drying, curing, and baking to form the anticorrosive treatment layer 14. As an example of the anticorrosive treatment agent, an anticorrosive treatment agent for coating-type chromate treatment, or the like can be mentioned.

The method of coating the anticorrosive treatment agent is not particularly limited. As examples of the method, mention can be made of gravure coating, gravure reverse coating, roll coating, reverse roll coating, die coating, bar coating, kiss coating, comma coating, and the like.

As the metal foil layer 13, an untreated metal foil may be used, or a metal foil degreased by wet-type degreasing or dry-type degreasing may be used.

Step (II)

Using an adhesive forming the first adhesive layer 12, the base layer 11 is stuck to the surface of the metal foil layer 13 opposite to the surface where the anticorrosive treatment layer 14 is formed.

Methods of sticking include techniques such as of dry lamination, non-solvent lamination, and wet lamination.

At step (II), aging (maturing) treatment may be performed within a range of room temperature to 100° C. to accelerate adhesiveness.

Step (III)

The sealant layer 16 is stuck, via the second adhesive layer 15, to the anticorrosive treatment layer 14 side of the laminate in which the base layer 11, the first adhesive layer 12, the metal foil layer 13, and the anticorrosive treatment layer 14 are laminated in this order.

In the case of a dry laminate configuration, the above adhesive is used to stick the sealant layer 16 onto the anticorrosive treatment layer 14 of the laminate, with a technique such as of dry lamination, non-solvent lamination, or wet lamination.

In the case of a thermal laminate configuration, the following dry process and wet process can be mentioned, for example. In the case of the dry process, an adhesive resin is extrusion-laminated on the anticorrosive treatment layer 14 of the laminate to form the second adhesive layer 15. Then, a film that forms the sealant layer 16 is further laminated on the second adhesive layer 15. The film that forms the sealant layer 16 is obtained by an inflation method or a cast method. Afterwards, for the purpose of improving adhesiveness between the anticorrosive treatment layer 14 and the second adhesive layer 15, heat treatment (aging treatment, heat lamination, or the like) may be performed. Alternatively, a multilayer film that is a laminate of the second adhesive layer 15 and the sealant layer 16 may be created by an inflation method or a cast method, and heat laminated on the laminate to laminate the sealant layer 16 via the second adhesive layer 15.

In the case of the wet process, a dispersion-type adhesive resin solution of an adhesive resin such as an acid-modified polyolefin resin is coated onto the anticorrosive treatment layer 14 of the laminate and the solvent is volatilized at a temperature equal to or higher than a melting point of the adhesive resin, followed by melting, softening and baking the adhesive resin to thereby form the second adhesive layer 15. Afterwards, the sealant layer 16 is laminated on the second adhesive layer 15 by heat treatment such as heat lamination.

Step (IV)

The base protective layer 17 is laminated on an outer surface (second surface) of the base layer 11. An example of a method of laminating the base protective layer 17 on the outer surface (second surface) of the base layer 11 includes a method of preparing a dispersion-type coating solution of a urethane resin that forms the base protective layer 17 and coating the solution with any of various coating methods such as a dipping or spraying method, followed by heating to volatilize the solvent to thereby perform baking. Alternatively, the base protective layer 17 may be formed by extrusion-molding or the like with which the urethane resin is melted for extrusion. The external surface of the base protective layer 17 may be processed such as by matte treatment.

The packaging material 1 of the present embodiment can be obtained through the steps (I) to (IV) described above.

The method of manufacturing the packaging material 1 is not limited to the method of sequentially performing the steps (I) to (IV). For example, the step (II) may be performed before the step (I). The step (IV) may be performed before the step (II). The formation of the anticorrosive treatment layer 14 may be continuously performed in an in-line manner with the extrusion lamination for laminating the sealant layer 16 on the second adhesive layer 15. Anticorrosive treatment layers may be provided on both surfaces of the metal foil layer.

According to the packaging material 1 of the present embodiment, the base protective layer 17 is formed of a base resin, which is a polyol, and a curing agent that contains at least one of a biuret type and an isocyanurate type of isocyanate. Accordingly, the packaging material can have enhanced resistance to an electrolytic solution owing to the base protective layer and can be favorably reused after wiping with an alcohol or the like.

The packaging material of the present invention will be described further by way of examples and comparative examples. However, the present invention is not limited at all by the specific contents of the examples.

Firstly, materials of the layers, except for the base protective layer, will be shown.

[Base Layer]

Film A-1: Nylon 6 film having a thickness of 25 μm

[First Adhesive Layer]

Adhesive B-1: Polyurethane adhesive (product name: "A525/A50" manufactured by Mitsui Chemicals Polyurethanes Inc.)

[Metal Foil Layer]

Metal foil C-1: Soft aluminum foil of material 8079 (manufactured by Toyo Aluminum K.K., with a thickness of 40 μm)

[Anticorrosive Treatment Layer]

Treatment agent D-1: Sodium polyphosphate-stabilized cerium oxide sol prepared using distilled water as a solvent to have a solid content concentration of 10 mass %, in which, phosphate salt was 10 parts by mass relative to 100 parts by mass of cerium oxide.

[Second Adhesive Layer]

Adhesive resin E-1: Maleic anhydride-modified polypropylene

[Sealant Layer]

Film F-1: Polyolefin film having a thickness of 40 μm

[Base Protective Layer]

As a material for the base protective layer, 14 types of coating solutions shown below were prepared.

Coating solution G-1: Coating solution obtained by dissolving, in toluene, a biuret type of 1,6-hexamethylene diisocyanate and an acrylic polyol such that a ratio (NCO/OH) was set at 2 (i.e., a ratio of NCO to OH was set at 2) and adding silica (mean particle size: 1 μm) as a filler.

Coating solution G-2: Coating solution obtained by dissolving, in toluene, an isocyanurate type of 1,6-hexamethylene diisocyanate and an acrylic polyol such that a ratio (NCO/OH) was set at 2, and adding silica as a filler.

Coating solution G-3: Coating solution obtained by dissolving, in toluene, a biuret type and an isocyanurate type of 1,6-hexamethylene diisocyanate and an acrylic polyol such that a ratio (NCO/OH) was set at 2, and adding silica as a filler. The ratio of the biuret type and the isocyanurate type was set at 1:1.

Coating solution G-4: Coating solution obtained by dissolving, in toluene, a biuret type and an adduct type of 1,6-hexamethylene diisocyanate and an acrylic polyol such that a ratio (NCO/OH) was set at 2, and adding silica as a filler. The ratio of the biuret type and the adduct type was set at 1:1.

Coating solution G-5: Coating solution obtained by dissolving, in toluene, an adduct type of tolylene diisocyanate, which is aromatic isocyanate, and an acrylic polyol such that a ratio (NCO/OH) was set at 2, and adding silica as a filler.

Coating solution G-6: Coating solution obtained by dissolving, in toluene, an adduct type of 1,6-hexamethylene diisocyanate and an acrylic polyol such that a ratio (NCO/OH) was set at 2, and adding silica as a filler.

Coating solution G-7: Coating solution obtained by dissolving, in toluene, a biuret type of 1,6-hexamethylene diisocyanate and a polyester polyol such that a ratio (NCO/OH) was set at 2, and adding silica as a filler.

Coating solution G-8: Coating solution obtained by dissolving, in toluene, an isocyanurate type of 1,6-hexamethylene diisocyanate and a polyester polyol such that a ratio (NCO/OH) was set at 2, and adding silica as a filler.

Coating solution G-9: Coating solution obtained by dissolving, in toluene, a biuret type and an isocyanurate type of 1,6-hexamethylene diisocyanate and a polyester polyol such that a ratio (NCO/OH) was set at 2, and adding silica as a filler. The ratio of the biuret type and the isocyanurate type was set at 1:1.

Coating solution G-10: Coating solution obtained by dissolving, in toluene, a biuret type and an adduct type of 1,6-hexamethylene diisocyanate and a polyester polyol such that a ratio (NCO/OH) was set at 2, and adding silica as a filler. The ratio of the biuret type and the adduct type was set at 1:1.

Coating solution G-11: Coating solution obtained by dissolving, in toluene, an adduct type of tolylene diisocyanate, which is aromatic isocyanate, and a polyester polyol such that a ratio (NCO/OH) was set at 2, and adding silica as a filler.

Coating solution G-12: Coating solution obtained by dissolving, in toluene, an adduct type of 1,6-hexamethylene diisocyanate and a polyester polyol such that a ratio (NCO/OH) was set at 2, and adding silica as a filler.

Coating solution G-13: Coating solution obtained by dissolving, in toluene, a biuret type of 1,6-hexamethylene diisocyanate and an acrylic polyol such that a ratio (NCO/OH) was set at 10, and adding silica as a filler.

Coating solution G-14: Coating solution obtained by dissolving, in toluene, a biuret type of 1,6-hexamethylene diisocyanate and a polyester polyol such that a ratio (NCO/OH) was set at 20, and adding silica as a filler.

[Preparation of Packaging Material for Power Storage Device]

The treatment agent D-1 was coated to one surface of the metal foil C-1 (first surface of the metal foil layer), followed by drying to form the anticorrosive treatment layer 14 on one surface of the metal foil layer 13. Next, using a dry laminate method, the film A-1 was stuck, with the adhesive B-1, to a surface of the metal foil layer 13 opposite to the anticorrosive treatment layer 14 (second surface of the metal foil layer), to thereby laminate the base layer 11 via the first adhesive layer 12. Afterwards, aging at 60° C. was performed for 6 days. Next, the adhesive resin E-1 was extruded by an extrusion device to the anticorrosive treatment layer 14 of the laminate thus obtained (at a position near the first surface of the thin metal layer), to stick the film F-1, followed by sandwich lamination to thereby stick the sealant layer 16 via the second adhesive layer 15. Afterwards, thermal press bonding was performed on the laminate thus obtained, under the condition of 160° C., 4 kg/cm², and 2 m/min. Next, any of the coating solutions G-1 to G-14 was coated onto the outer surface of the base layer 11 (second surface of the base layer) by means of a gravure coating method, followed by aging at 40° C. for 3 days to thereby form the base protective layer 17. The packaging materials of Examples 1 to 4 and Comparative Examples 1 and 2 were thereby prepared.

For the packaging materials of the examples and comparative examples, resistance to alcohols and resistance to electrolytic solutions were evaluated by the following method.

Evaluation of resistance to alcohols: The base protective layer side of the prepared base was rubbed in one direction with a waste cloth impregnated with ethanol, and the number of times of rubbing that caused separation of the base protective layer was measured. The evaluation was made on 3 scales as follows:

50 times or less: (insufficient)
50 to 100 times: (fair)
100 times or more: (good)

Evaluation of resistance to electrolytic solutions: EC:DEC:DMC=1:1:1+LiPF$_6$ was dropped on a plurality of portions of the base protective layer. The resultant object was then left standing in an environment of 25 degrees and 65% RH (relative humidity). The electrolytic solution was wiped off at a rate of one portion per lapse of a given time, and further, the same portion was wiped again with a waste cloth impregnated with isopropyl alcohol (IPA). Then, the external appearance was evaluated by visual inspection. The evaluation was made on 3 scales as follows:

Alteration or separation of the base protective layer was observed within 12 hours: (insufficient)
Alteration or separation of the base protective layer was observed after 12 hours but within 24 hours: (fair)
Neither alteration nor separation of the base protective layer was observed when wiped after 24 hours: (good)

Evaluation results of the resistance to alcohols and the resistance to electrolytic solutions are shown in Table 1.

TABLE 1

|  | Base Protective Layer | Resistance to Alcohols | Resistance to Electrolytic Solutions |
|---|---|---|---|
| Example 1 | G-1 | good | excellent |
| Example 2 | G-2 | good | excellent |
| Example 3 | G-3 | fair | fair |
| Example 4 | G-4 | fair | fair |
| Example 5 | G-7 | good | excellent |
| Example 6 | G-8 | good | excellent |
| Example 7 | G-9 | fair | fair |
| Example 8 | G-10 | fair | fair |
| Example 9 | G-13 | good | excellent |
| Example 10 | G-14 | good | excellent |
| Comparative Example 1 | G-5 | insufficient | insufficient |
| Comparative Example 2 | G-6 | insufficient | insufficient |
| Comparative Example 3 | G-11 | insufficient | insufficient |
| Comparative Example 4 | G-12 | insufficient | insufficient |

In Examples 1, 2, 5, 6, 9, and 10 in which only either one of a biuret type and an isocyanurate type of isocyanate was used as the curing agent, both of the resistance to alcohols and the resistance to electrolytic solutions were good. In Examples 3, 4, 7, and 8 in which a mixture that contains at least one of a biuret type and an isocyanurate type of isocyanate were used as the curing agent, although both of the resistance to alcohols and the resistance to electrolytic solutions was not as good as of those in Examples 1, 2, 5, 6, 9, and 10, desired performances were sufficiently achieved. The above results were considered to be caused by the fact that the curing agent contained a biuret type or an isocyanurate type of isocyanate which led to increase of the crosslink density of the base protective layer and dense structure of the layer.

On the other hand, in Comparative Examples 1, 2, 3, and 4 in which the curing agent that contained neither a biuret type nor an isocyanurate type of isocyanate was used, the base protective layer was easily separated, exhibiting insufficient resistance.

Next, moldability of the packaging material was evaluated by a method described below.

As a material of the base protective layer, 10 types of coating solutions set forth below were prepared, and packaging materials were prepared with the same procedure as that of the above examples.

Coating solution G-7: Coating solution obtained by dissolving, in toluene, a biuret type and an adduct type of 1,6-hexamethylene diisocyanate and an acrylic polyol such that a ratio (NCO/OH) was set at 2, and adding silica (mean particle size: 1 μm) as a filler. The ratio of the biuret type and the adduct type was set at 1:9.

Coating solution G-8: Coating solution obtained by dissolving, in toluene, a biuret type and an adduct type of 1,6-hexamethylene diisocyanate and an acrylic polyol such that a ratio (NCO/OH) was set at 2, and adding silica (mean particle size: 1 μm) as a filler. The ratio of the biuret type and the adduct type was set at 2:8.

Coating solution G-9: Coating solution obtained by dissolving, in toluene, a biuret type and an adduct type of 1,6-hexamethylene diisocyanate and an acrylic polyol such that a ratio (NCO/OH) was set at 2, and adding silica (mean particle size: 1 μm) as a filler. The ratio of the biuret type and the adduct type was set at 3:7.

Coating solution G-10: Coating solution obtained by dissolving, in toluene, a biuret type and an adduct type of 1,6-hexamethylene diisocyanate added to an acrylic polyol such that a ratio (NCO/OH) was set at 2, and adding silica (mean particle size: 1 μm) as a filler. The ratio of the biuret type and the adduct type was set at 4:6.

Coating solution G-11: Coating solution obtained by dissolving, in toluene, a biuret type and an adduct type of 1,6-hexamethylene diisocyanate and an acrylic polyol such that a ratio (NCO/OH) was set at 2, and adding silica (mean particle size: 1 μm) as a filler. The ratio of the biuret type and the adduct type was set at 5:5.

Coating solution G-12: Coating solution obtained by dissolving, in toluene, a biuret type and an adduct type of 1,6-hexamethylene diisocyanate added to a polyester polyol such that a ratio (NCO/OH) was set at 2, and adding silica (mean particle size: 1 μm) as a filler. The ratio of the biuret type and the adduct type was set at 1:9.

Coating solution G-13: Coating solution obtained by dissolving, in toluene, a biuret type and an adduct type of 1,6-hexamethylene diisocyanate and a polyester polyol such that a ratio (NCO/OH) was set at 2, and adding silica (mean particle size: 1 μm) as a filler. The ratio of the biuret type and the adduct type was set at 2:8.

Coating solution G-14: Coating solution obtained by dissolving, in toluene, a biuret type and an adduct type of 1,6-hexamethylene diisocyanate and a polyester polyol such that a ratio (NCO/OH) was set at 2, and adding silica (mean particle size: 1 μm) as a filler. The ratio of the biuret type and the adduct type was set at 3:7.

Coating solution G-15: Coating solution obtained by dissolving, in toluene, a biuret type and an adduct type of 1,6-hexamethylene diisocyanate and a polyester polyol such that a ratio (NCO/OH) was set at 2, and adding silica (mean particle size: 1 μm) as a filler. The ratio of the biuret type and the adduct type was set at 4:6.

Coating solution G-16: Coating solution obtained by dissolving, in toluene, a biuret type and an adduct type of 1,6-hexamethylene diisocyanate and a polyester polyol such that a ratio (NCO/OH) was set at 2, and adding silica (mean particle size: 1 μm) as a filler. The ratio of the biuret type and the adduct type was set at 5:5.

As the evaluation of moldability, the film size of the packaging material was set at 150 mm×200 mm. With a molded size of 50 mm×69 mm, the molding depth that enabled molding with no damage such as cracks or breakage was measured. Evaluation criteria were as follows:

4.0 mm or more: (fair)
Less than 4.0 mm: (insufficient)

The molding was performed using a punch die having a vertical-direction R of 0.6 mm and a corner R of 1.0 mm, at a molding speed of 5 mm/sec.

TABLE 2

| | Protective Layer Material | Biuret Ratio (Mass %) | Mold-ability | Resistance to Alcohols | Resistance to Electrolytic Solutions |
|---|---|---|---|---|---|
| Example 11 | G-7 | 10 | fair | fair | fair |
| Example 12 | G-8 | 20 | fair | fair | fair |
| Example 13 | G-9 | 30 | fair | fair | fair |
| Example 14 | G-10 | 40 | fair | fair | fair |
| Reference Example 1 | G-11 | 50 | insufficient | fair | fair |
| Example 15 | G-12 | 10 | fair | fair | fair |
| Example 16 | G-13 | 20 | fair | fair | fair |
| Example 17 | G-14 | 30 | fair | fair | fair |
| Example 18 | G-15 | 40 | fair | fair | fair |
| Reference Example 2 | G-16 | 50 | insufficient | fair | fair |

As shown in Table 2, in all of Examples 11 to 18, and Reference Examples 1 and 2, the resistance to alcohols and the resistance to electrolytic solutions satisfied the evaluation criteria. Regarding moldability, molding was performed in Examples 11 to 18 without any problems. However, in Reference Examples 1 and 2 in which the biuret ratio to the total mass of the curing agent was 50 mass %, cracks occurred in the protective layer, causing deterioration in moldability. In Examples 11 to 18 in which the biuret ratio to the total mass of the curing agent was 10 mass % to 40 mass %, molding with a molding depth of 4.0 mm or more was performed without any problem. It is considered that, in the case of adopting a configuration of the reference examples, the reference examples can be favorably used depending on the range of the molding depth (e.g., configuration having a small molding depth).

An embodiment and examples of the present invention have so far been described. However, the technical scope of the present invention is not limited to the above embodiment. Alterations to the combination of the components, various alterations to or deletions of components are possible as long as they do not cause departure from the spirit of the present invention.

For example, in the packaging material of the present embodiment, an adhesive layer may be provided between the base protective layer and the base layer, and a pigment may be mixed in the adhesive layer or the first adhesive layer. By doing so, the elasticity modulus of the adhesive layer can be adjusted, and reliability such as in the resistance to high-temperature, moisture, or electrolytic solutions after deep-drawing or stretching of the packaging material can be enhanced. Coloring of the packaging material enables identification of the package, and hence if a label or a print attached to the package is forged, a genuine product can be distinguished from a forged product by the difference in color of the package, exerting an effect of preventing forgery.

REFERENCE SIGNS LIST

1: packaging material for power storage device
11: base layer
12: first adhesive layer
13: metal foil layer
14: anticorrosive treatment layer
15: second adhesive layer
16: sealant layer
17: base protective layer

What is claimed is:

1. A packaging material for a power storage device, comprising:
    a base layer having a first surface and a second surface, the first surface having at least a first adhesive layer, a metal foil layer, an anticorrosive treatment layer, a second adhesive layer, and a sealant layer laminated thereon in this order; and
    a base protective layer laminated on the second surface of the base layer, and formed containing a base resin consisting of a polyester polyol which has a group having a hydroxyl group on a side chain, and a curing agent containing at least one type of isocyanate selected from the group consisting of a biuret type of isocyanate, an isocyanurate type of isocyanate, and combinations thereof,
    wherein a ratio of the biuret type or the isocyanurate type to a total mass of the curing agent is in a range of about 10 mass percent or more
    wherein the base protective layer contains a filler having a mean particle size of the filler in a range of 0.2 μm or more to less than 3 μm and
    wherein a molar ratio of the isocyanate group contained in the isocyanate of the curing agent to the hydroxyl group contained in the polyol of the base resin (NCO/OH) is 1 to 20.

2. The packaging material for a power storage device of claim 1, wherein a ratio of the biuret type and the isocyanurate type to a total mass of the curing agent is about 10 mass percent or more.

3. The packaging material for a power storage device of claim 1, wherein the curing agent contains only one of the biuret type or the isocyanurate type.

4. The packaging material for a power storage device of claim 1, wherein the curing agent contains both the biuret type and the isocyanurate type.

5. The packaging material for a power storage device of claim 1, wherein the isocyanate is 1,6-hexamethylene diisocyanate.

6. The packaging material for a power storage device of claim 1, wherein the first adhesive layer contains a filler.

7. The packaging material for a power storage device of claim 1, wherein the curing agent contains a) the biuret type of isocyanate and b) at least one of isocyanurate type of isocyanate or adduct type of isocyanate.

8. The packaging material for a power storage device of claim 1, wherein the curing agent contains the biuret type of isocyanate and an adduct type of isocyanate.

9. The packaging material for a power storage device of claim 8, wherein a ratio of the biuret type to a total mass of the curing agent is in a range of about 10 mass percent or more to about 40 mass percent or less.

10. A packaging material for a power storage device, comprising:
   a base layer having a first surface and a second surface, the first surface having at least a first adhesive layer, a metal foil layer, an anticorrosive treatment layer, a second adhesive layer, and a sealant layer laminated thereon in this order; and
   a base protective layer laminated on the second surface of the base layer, and formed containing a base resin consisting of an acrylic polyol, which has a group having a hydroxyl group on a side chain, and a curing agent containing at least one type of isocyanate selected from the group consisting of a biuret type of isocyanate, an isocyanurate type of isocyanate, and combinations thereof,
   wherein a ratio of the biuret type or the isocyanurate type to a total mass of the curing agent is in a range of about 10 mass percent or more,
   wherein the base protective layer contains a filler having a mean particle size of the filler in a range of 0.2 μm or more to less than 3 μm and
   wherein a molar ratio of the isocyanate group contained in the isocyanate of the curing agent to the hydroxyl group contained in the polyol of the base resin (NCO/OH) is 1 to 20.

11. The packaging material for a power storage device of claim 10, wherein a ratio of the biuret type and the isocyanurate type to a total mass of the curing agent is about 10 mass percent or more.

12. The packaging material for a power storage device of claim 10, wherein the curing agent contains only one of the biuret type or the isocyanurate type.

13. The packaging material for a power storage device of claim 10, wherein the curing agent contains both the biuret type and the isocyanurate type.

14. The packaging material for a power storage device of claim 10, wherein the isocyanate is 1,6-hexamethylene diisocyanate.

15. The packaging material for a power storage device of claim 10, wherein the first adhesive layer contains a filler.

16. The packaging material for a power storage device of claim 10, wherein the curing agent contains a) the biuret type of isocyanate and b) at least one of isocyanurate type of isocyanate or adduct type of isocyanate.

17. The packaging material for a power storage device of claim 10, wherein the curing agent contains the biuret type of isocyanate and an adduct type of isocyanate.

18. The packaging material for a power storage device of claim 17, wherein a ratio of the biuret type to a total mass of the curing agent is in a range of about 10 mass percent or more to about 40 mass percent or less.

* * * * *